United States Patent
Barsness et al.

(10) Patent No.: US 8,677,161 B2
(45) Date of Patent: *Mar. 18, 2014

(54) OPTIMIZING POWER CONSUMPTION AND PERFORMANCE IN A HYBRID COMPUTER ENVIRONMENT

(71) Applicant: International Business Machines Corporation, Armonk, NY (US)

(72) Inventors: Eric L. Barsness, Pine Island, MN (US); David L. Darrington, Rochester, MN (US); Amanda Randles, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/771,068

(22) Filed: Feb. 19, 2013

(65) Prior Publication Data

US 2013/0159745 A1 Jun. 20, 2013

Related U.S. Application Data

(63) Continuation of application No. 12/368,513, filed on Feb. 10, 2009.

(51) Int. Cl.
*G06F 1/00* (2006.01)
(52) U.S. Cl.
USPC .......................................... 713/300

(58) Field of Classification Search
USPC .......................................... 713/300
See application file for complete search history.

(56) References Cited

U.S. PATENT DOCUMENTS

| 8,037,329 | B2 | 10/2011 | Leech et al. |
|---|---|---|---|
| 2005/0125701 | A1 | 6/2005 | Hensbergen et al. |
| 2006/0248262 | A1 | 11/2006 | Lin et al. |
| 2007/0220293 | A1 | 9/2007 | Takase |
| 2008/0010408 | A1 | 1/2008 | Shen et al. |
| 2008/0051046 | A1 | 2/2008 | Ruckriem |
| 2008/0104324 | A1 | 5/2008 | Raghuvanshi |
| 2009/0144747 | A1 | 6/2009 | Baker |
| 2010/0122256 | A1 | 5/2010 | Darrington et al. |
| 2010/0205137 | A1* | 8/2010 | Barsness et al. ............... 706/52 |
| 2011/0072056 | A1 | 3/2011 | Bakalash et al. |

\* cited by examiner

*Primary Examiner* — Kim Huynh
*Assistant Examiner* — Alyaa T Mazyad
(74) *Attorney, Agent, or Firm* — Martin & Associates, LLC; Bret J. Petersen (57) ABSTRACT

A method for optimizing efficiency and power consumption in a hybrid computer system is disclosed. The hybrid computer system may comprise one or more front-end nodes connected to a multi-node computer system. Portions of an application may be offloaded from the front-end nodes to the multi-node computer system. By building historical profiles of the applications running on the multi-node computer system, the system can analyze the trade offs between power consumption and performance. For example, if running the application on the multi-node computer system cuts the run time by 5% but increases power consumption by 20% it may be more advantageous to simply run the entire application on the front-end.

13 Claims, 6 Drawing Sheets

145
Application Profile

| User Priorities 410 |||||
|---|---|---|---|
| Time of Day 412 | System Temperature 414 | Power Consumption Versus Runtime 416 | Cost To Run 418 |

| Application Characteristics 420 ||||
|---|---|---|---|
| Hardware Match Characteristics 422 | Historical Network Utilization 424 | Historical Power Consumption 426 | Historical Run time 428 |

OPTIMIZING POWER CONSUMPTION AND PERFORMANCE IN A HYBRID COMPUTER ENVIRONMENT

BACKGROUND

1. Technical Field

The disclosure and claims herein generally relate to hybrid computer environments such as those with a multi-node computer system, and more specifically relate to optimizing between the power consumption and performance of a software module executing in a hybrid computer environment with a multi-node computer system.

2. Background Art

Supercomputers and other multi-node computer systems continue to be developed to tackle sophisticated computing jobs. One type of multi-node computer system is a massively parallel computer system. A family of such massively parallel computers is being developed by International Business Machines Corporation (IBM) under the name Blue Gene. The Blue Gene/L system is a high density, scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

Computer systems such as Blue Gene have a large number of nodes, each with its own processor and local memory. The nodes are connected with several communication networks. One communication network connects the nodes in a logical tree network. In the logical tree network, the Nodes are connected to an input-output (I/O) node at the top of the tree. In Blue Gene, there are 2 compute nodes per node card with 2 processors each. A node board holds 16 node cards and each rack holds 32 node boards. A node board has slots to hold 2 I/O cards that each have 2 I/O nodes.

Applications coded for massively parallel systems are sometimes ported to a variety of platforms. Entities executing these applications may have a large computer center with several of the large platforms available. Front-end nodes on the large platforms compile and launch jobs. In some applications, a portion of the application is run on the front-end node and then a computationally expensive region of the code is offloaded to a massively parallel computer platform such as a Blue Gene system. In the prior art, application hooks identifying the computationally expensive region automatically offload the computationally expensive module to the Blue Gene system. In some cases an application may see a huge performance improvement based on the architecture of the system executing the application. For example, code that makes strong use of Blue Gene architecture may provide a large jump in performance compared to the code being run on other systems. However, the Applicants herein have found that offloading the application to be processed on a multi-node computer system may result in a less than optimum use of power.

Without an efficient way to offload applications between platforms in a hybrid computer system environment, hybrid computer systems will continue to suffer from reduced performance and increased power consumptions by the computer system.

BRIEF SUMMARY

The specification and claims herein are directed to optimizing efficiency and power consumption in a hybrid computer system. The hybrid computer system may comprise one or more front-end nodes connected to a multi-node computer system. Portions of an application may be offloaded from the front-end nodes to the multi-node computer system. By building historical profiles of the applications running on the multi-node computer system, the system can analyze the trade offs between power consumption and performance. For example, if running the application on the multi-node computer system cuts the run time by 5% but increases power consumption by 20% it may be more advantageous to simply run the entire application on the front-end.

The description and examples herein are directed to a massively parallel computer system such as the Blue Gene architecture, but the claims herein expressly extend to other parallel computer systems with multiple processors arranged in a network structure.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to optimizing efficiency and power consumption in a hybrid computer system. By building historical profiles of the applications running on the multi-node computer system, the system can analyze the trade offs between power consumption and performance. The examples herein will be described with respect to the Blue Gene/L massively parallel computer developed by International Business Machines Corporation (IBM).

Figure 1:
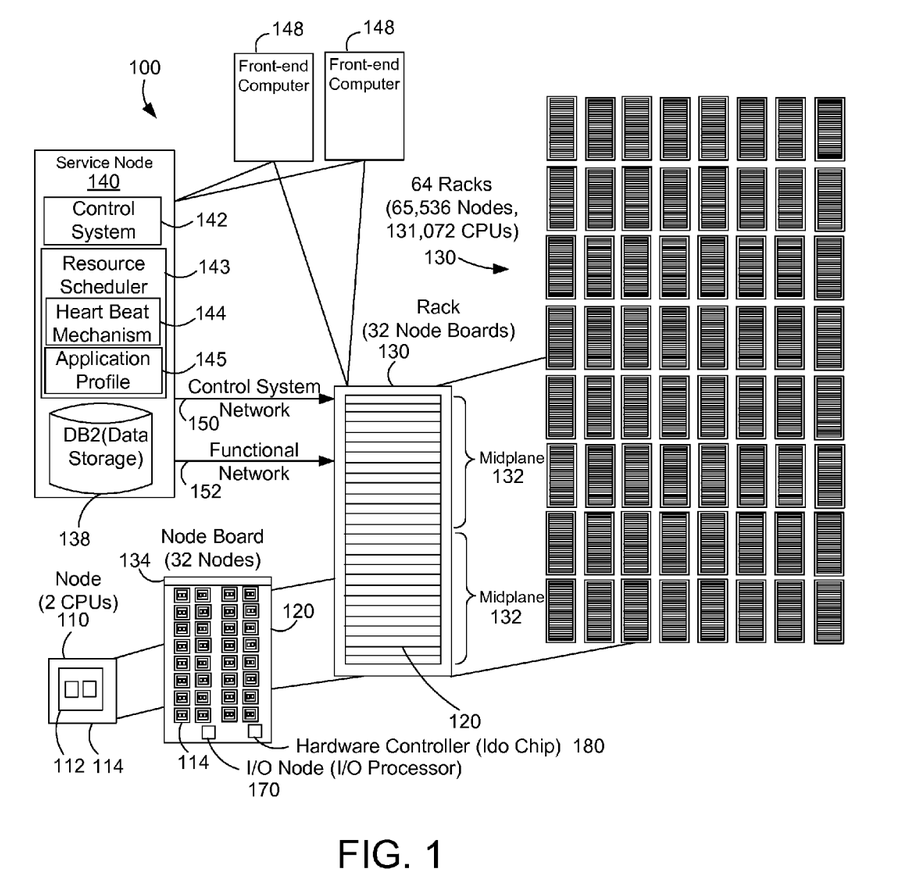
FIG. 1 is a block diagram of a massively parallel computer system.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board with a midplane connector 134. The midplane circuit board is inside the rack and not shown in FIG. 1. The midplane 132 includes all the node boards connected to the midplane circuit board and the nodes in the node boards. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where each I/O node has an I/O processor connected to the service node 140. The service node 140 is connected to the nodes thorough a control system network 150 and a functional network 152. The functional network is a gigabit Ethernet network connected to an I/O processor (or Blue Gene/L link chip) in the I/O node 170 located on a node board 120 that handles communication from the service node 160 to a number of nodes. The Blue Gene/L system has one or more I/O nodes 170 connected to the node board 120. The I/O processors can be configured to communicate with 8, 32 or 64 nodes. The service node 140 uses the control system network 150 to control connectivity by communicating to link cards on the compute nodes. The connections to the I/O nodes are similar to the connections to the compute node except the I/O nodes are not connected to the torus network that interconnects the compute nodes.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150 and a functional network 152. The control system network provides control, test, and bring-up infrastructure for the Blue Gene/L system. The control system network 150 includes various network interfaces that provide the necessary communication for the massively parallel computer system. The service node 140 is also connected to the front-end computers 148. The front-end computers 148 may be one or more different computer platforms that combined with the multi-node computer system make up a hybrid computer system.

The service node 140 communicates through the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node.

The service node includes a database 138 (DB2) for local data storage. The service node further includes a control system 142 to control the operation of the multi-node computer system 100. The service node 140 also includes a resource scheduler 143 for allocating and scheduling work processes and data placement on the compute nodes. The service node further includes a heart beat mechanism 144 and an application profile 145 for one or more applications. These are described further below.

Figure 2:
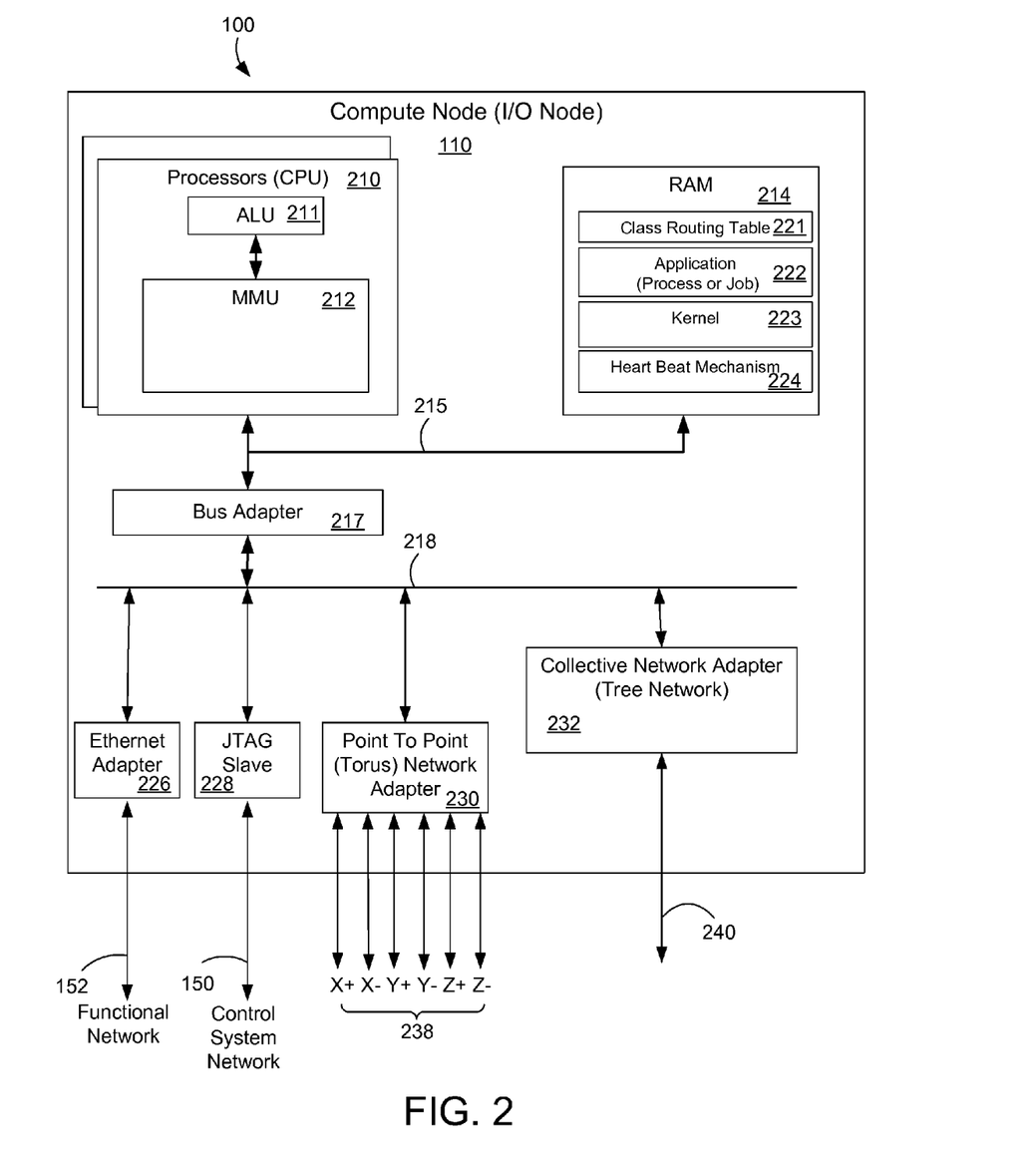
FIG. 2 is a block diagram of a compute node in a massively parallel computer system.

FIG. 2 illustrates a block diagram of an exemplary compute node as introduced above. FIG. 2 also represents a block diagram for an I/O node, which has the same overall structure as the compute node. A notable difference between the compute node and the I/O nodes is that the Ethernet adapter 226 is connected to the control system on the I/O node but is not used in the compute node. The compute node 110 of FIG. 2 includes a plurality of computer processors 210, each with an arithmetic logic unit (ALU) 211 and a memory management unit (MMU) 212. The processors 210 are connected to random access memory (RAM) 214 through a high-speed memory bus 215. Also connected to the high-speed memory bus 215 is a bus adapter 217. The bus adapter 217 connects to an extension bus 218 that connects to other components of the compute node.

Again referring to FIG. 2, stored in RAM 214 is a class routing table 221, an application 222, an operating system kernel 223 and a heartbeat mechanism 144. The class routing table 221 stores data for routing data packets on the collective network or tree network as described more fully below. The application 222 is a user software application, process or job that is loaded on the node by the control system to perform a designated task. The application program typically runs in parallel with application programs running on adjacent nodes. The operating system kernel 223 is a module of computer program instructions and routines for an application program to access to other resources of the compute node. The quantity and complexity of tasks to be performed by an operating system on a compute node in a massively parallel computer are typically smaller and less complex than those of an operating system on a typical stand alone computer. The operating system may therefore be quite lightweight by comparison with operating systems of general purpose computers, a pared down version as it were, or an operating system developed specifically for operations on a particular massively parallel computer. The heartbeat mechanism 144 on the compute nodes works in conjunction with the heartbeat mechanism on the service node to monitor the compute node and send back historical data as described further below.

The compute node 110 of FIG. 2 includes several communications adapters 226, 228, 230, 232 for implementing data communications with other nodes of a massively parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example I/O node 110 for data communications to a Gigabit Ethernet on the Functional network 152. In Blue Gene, this communication link is only used on I/O nodes and is not connected on the compute nodes. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network or control system network 150. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 228 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: +x, −x, +y, −y, +z, and −z. The torus network logically connects the compute nodes in a lattice like structure that allows each compute node 110 to communicate with its closest 6 neighbors.

The data communications adapters in the example of FIG. 2 include a collective network or tree network adapter 232 that couples the compute node 110 for data communications to a network 240 configured as a binary tree. This network is also sometimes referred to as the collective network. Collective network adapter 232 provides data communications through three bidirectional links: two links to children nodes and one link to a parent node (not shown). The collective network adapter 232 of each node has additional hardware to support operations on the collective network.

Again referring to FIG. 2, the collective network 240 extends over the compute nodes of the entire Blue Gene machine, allowing data to be sent from any node to all others (broadcast), or a subset of nodes. Each node typically has three links, with one or two links to a child node and a third connected to a parent node. Arithmetic and logical hardware is built into the collective network to support integer reduction operations including min, max, sum, bitwise logical OR, bitwise logical AND, and bitwise logical XOR. The collective network is also used for global broadcast of data, rather than transmitting it around in rings on the torus network. For one-to-all communications, this is a tremendous improvement from a software point of view over the nearest-neighbor 3D torus network.

Figure 3:
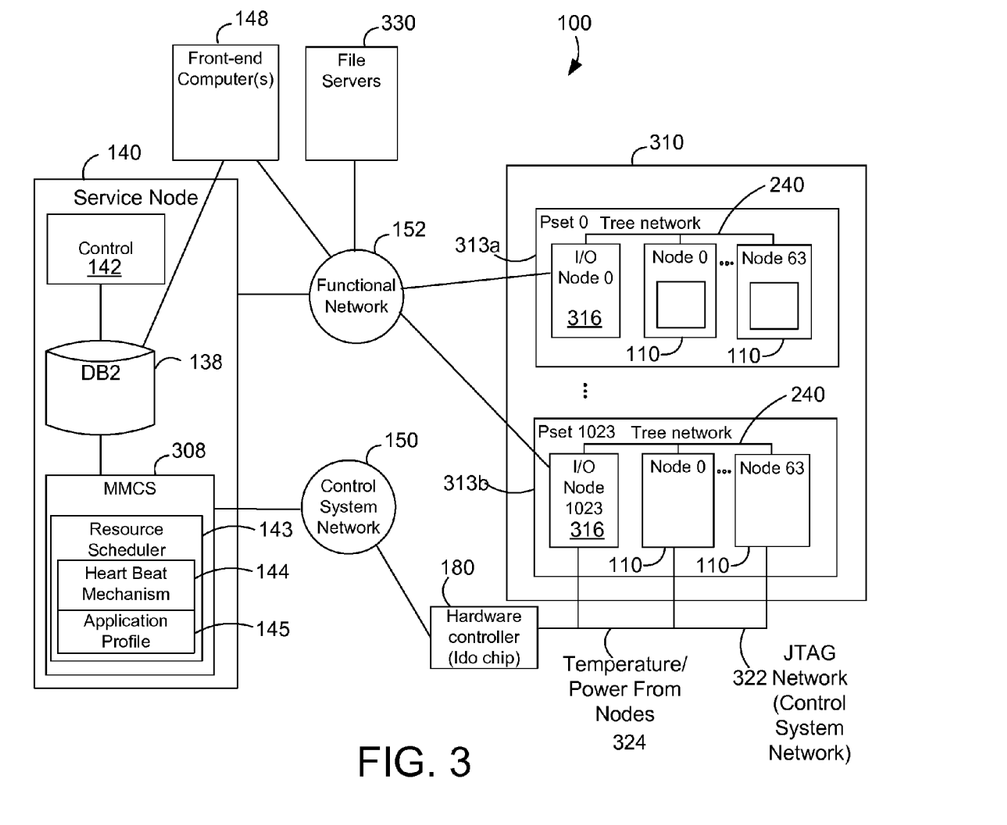
FIG. 3 shows a block with more detail of the hybrid computer system shown in FIG. 1.

FIG. 3 shows another block diagram that represents another way to view the system architecture of the Blue Gene/L computer system. FIG. 3 includes a representation of all the compute nodes 110 of the computer system 100 as a compute core 310 connected to the service node 140 with the control system 142. The compute core 310 communicates with the service node 140 and the control system 142 over the control system network 150 as described briefly above with reference to FIG. 1. The compute core 310 is also connected to the service node through the functional network 152. The control system network 150 connects the nodes 110 to the service node through a hardware controller 180. The hardware controller converts the Ethernet on the control system network 150 to a serial JTAG signal that is connected to each I/O node 316 and compute node 110 through the JTAG network 322 (part of the control system network). The hardware controller 180 resides in the rack 130 (FIG. 1) and provides an interface for the control system 212 to configure the compute nodes 110 and load data into the compute nodes' memory. In the Blue GeneL computer system, the hardware controller 180 is called the "Ido chip". The JTAG network connects to each of the I/O nodes 316 and nodes 110 and is able to gather temperature information 324 from each of the nodes. The temperature information is then used to determine the amount of power being used by the system. Using the hardware controller 180, the service node 140 is thus able to gather and compute power information to be used as described herein.

Further, as shown in FIG. 3, the compute core 310 also communicates with file servers 330 and one or more front-end computers 148 over a functional network 152. The file servers 330 store data for user applications and system images. The front-end computer 148 holds programs for user interaction with the computer system 100. The service node 142 includes a database, called "DB2" 138 connected to the front-end computer 148. The DB2 holds block tables and other hardware information used by the mid-plane management and control system (MMCS) 308 in the service node 140. The MMCS 308 is responsible for controlling the allocation of hardware in the compute core 310. In the preferred embodiments, the MMCS 308 includes a resource scheduler 143 to allocate applications to computer resources as described further below. In preferred embodiments, the resource scheduler 143 includes a heard beat mechanism 144 and application profiles 145 also as described below. The application profiles 145 may also be stored in the DB2 138.

Again referring to FIG. 3, the compute core 310 illustrates the compute nodes 110 (housed in racks 130 shown in FIG. 1). The compute nodes 110 are grouped together in 1024 groups called Psets. The Psets are illustrated by representation, where Pset0 213a and Pset1023 213b are shown explicitly and the remaining (Pset 1 through Pset 1022) are implied. A Pset is a group of 64 nodes that are grouped together in a set for communication with an I/O node 216. The I/O node 216 provides communication over the functional network and other networks to the compute nodes 110 in the Pset. In the Blue Gene/P system, an I/O node 216 communicates with between 8 and 128 compute nodes 110, represented by Node0 and Node63. The nodes 110 are connected by a tree network 214 as shown and described briefly above.

Figure 4:
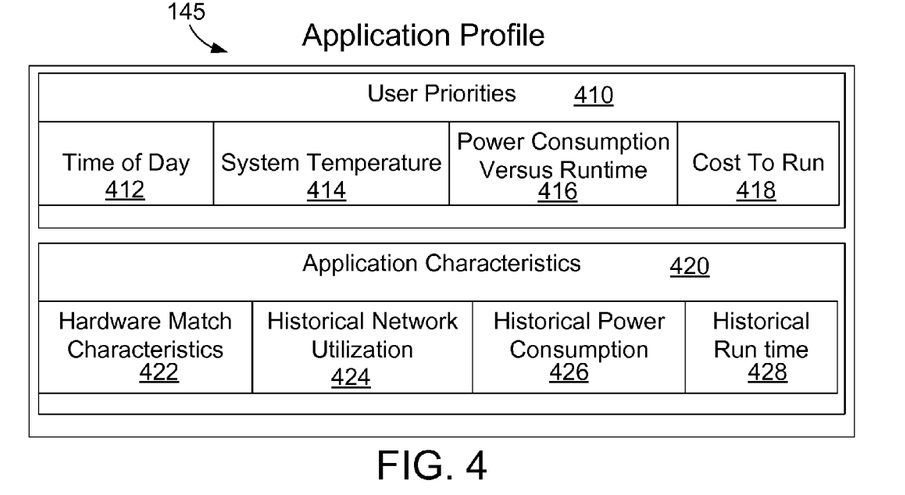
FIG. 4 shows a block diagram of information stored in an application profile.

FIG. 4 shows a block diagram that represents the type of data that is stored in an application profile to facilitate optimization of efficiency and power consumption in a hybrid computer system. The application profile 145 preferably includes user priorities 410 and application characteristics 420. The user priorities are thresholds or limits that are set by the user or a system administrator to control the resource scheduler's actions to optimize power and performance of the hybrid system. In the illustrated example, the user priorities 410 include a time of day 412, system temperature 414, power consumption versus run time 416 and cost to run 418. The time of day 412, gives preferences for optimization depending on the time of day to allow the user to control utilization of resources at peak times. System temperature 414 allows the user to give an optimization preference based on a temperatures such as an average temperature of the nodes, etc. Power consumption versus runtime 416 allows the user to set a user priority for the amount of power consumption or savings of power such as how much power savings must be attained before making a decision to use a slower system resource. Similarly, the cost to run 418 allows the user to set a decision point on the cost to run the application before placing the application on the multi-node computer system or a slower system.

FIG. 4 further shows application characteristics 420. The application characteristics 420 include hardware match characteristics 422, historical network utilization 424, historical power consumption 426, and historical run time 428. The hardware match characteristics 422 are used to determine what platform to best place the application for accelerated execution. These characteristics may include the method and extent of parallelization in the code and whether single instruction multiple hardware (SIMD) can be used effectively. SIMD hardware uses what is called a double hummer floating point unit that allows instructions to be carried out on two sets of registers at a time. The historical application characteristics are determined by monitoring the application during execution. The historical network utilization 424 reflects the historical utilization or loading of the networks while executing the application. The historical power consumption 426 is the power consumed by the compute nodes and may be calculated from the historical temperature/power of the nodes (324 in FIG. 3 and described above). The historical run time 428 is the amount of processor time required to execute the application in the past on a particular platform. There may be application characteristics 420 stored for multiple applications on multiple platforms.

The resource scheduler 143 (FIG. 1) uses the application profiles for applications in a hybrid computer system to analyze tradeoffs between power consumption and performance. The resource scheduler can optimize the efficiency and power consumption in the hybrid computer system by scheduling when and where to execute the application based on information in the application profile. A heart beat mechanism 144 (FIG. 1) is used to gather historical information stored in the application profile. The heart beat mechanism 144 preferably would run continuously to gather the historical network utilization, historical power consumption and historical runtime of each application running on each platform and then store this information in the application profile 145. The resource scheduler can determine where to execute the application based on the application profile when a portion of the application is to be accelerated or prior to beginning the application.

In the first case, the resource scheduler 143 determines where to execute the application based on the application profile when the application encounters a section of code that can be accelerated on a multi-node computer system (such as a massively parallel computer system). This may be done by special hooks in the code that indicate the code may be accelerated or by analyzing the code. The heart beat mechanism is used to monitor the progress of the application to update the application profile upon completion of the application. The resource scheduler also monitors the performance of the application and changes the location of acceleration dynamically if needed by moving the application to a more appropriate platform. Upon completion of the application, the gathered historical information is saved in the application profile.

An example of the resource scheduler determining where to accelerate a section of an application based on an application profile will now be described. In this case, it is assumed that the application begins execution on a front-end system and runs until hooks for the accelerated portion are encountered. The resource scheduler accesses the user priorities and application characteristics for this application in the application profile to determine whether to accelerate the application. For this example, it is assumed that there is a power consumption versus runtime (416 in FIG. 4) user priority for this application. For this example, we assume this user priority sets up the energy consumption with a higher priority than runtime with a medium strictness. This means that energy consumption is a higher priority but a moderate amount of additional energy consumption is tolerable. It is also assumed that the historical runtime (428 in FIG. 4) on the multi-node computer system is 50% faster for this application than the historical runtime on the front-end computer system, and the historical power consumption (426 in FIG. 4) for this application is 3% higher on the multi-node computer system than on the front-end computer system. The resource scheduler analyzes this information in the application profile and determines that the power consumption is low (3%) compared to the run time improvement (50%). Thus the resource scheduler would send the application to the multi-node computer system for accelerated execution. In contrast, if the power consumption was higher or the strictness was higher, then the additional power consumption would indicate not to accelerate the application to save power by running the application in a front-end computer system.

Another example of the resource scheduler will now be described. In this case, it is also assumed that the application runs until hooks for the accelerated portion are encountered as described above and then accesses the user priorities and application characteristics to determine whether to accelerate the application. For this example, it is assumed that the user priorities include a time of day priority that the application should run on the front-end computer system and not be accelerated on the multi-node computer system where the historical run time on the multi-node computer system is greater than 1 minute and the current time of day is between the hours of 8:00 AM and 5:00 PM. It is also assumed that the historical runtime for this application on the multi-node computer system is greater than 1 minute and the time of day is 11:00 AM. The resource scheduler analyzes this information in the application profile and determines historical run time is greater than the threshold for the current time of day (11:00 AM). Thus the resource scheduler would not send the application to the multi-node computer system for accelerated execution at this time. If the current time were after 5:00 PM, then the resource scheduler would sent the application to be accelerated on the multi-node system.

In another example, it is assumed that the user priorities include a system temperature priority that the application should run on the front-end computer system and not be accelerated on the multi-node computer system where the historical temperature on the multi-node computer system is greater than X degrees. It is also assumed that the historical runtime for this application on the multi-node computer system is greater than X degrees. The resource scheduler analyzes this information in the application profile and determines the historical temperature is above the user priority. Thus the resource scheduler would not send the application to the multi-node computer system for accelerated execution.

In another example, it is assumed that the user priorities include a cost to run priority (418 in FIG. 4) that the application should be accelerated on a multi-node computer system when the cost is within a threshold. The cost to run may be determined by a combination of the historical power consumption 426, historical runtime 428 and could include other criteria such as the current time of day. The resource scheduler analyzes this information in the application profile and determines the current cost to run the application is above the threshold in the cost to run user priority 418. Thus the resource scheduler would not send the application to the multi-node computer system for accelerated execution.

In another example, it is assumed that the application profile includes application characteristics for an application that indicates the application has parallel programming structures. The resource scheduler analyzes this information in the application profile. The resource scheduler knows that these parallel programming structures can best be accelerated in a particular multi-node computer platform. Thus the resource scheduler would send the application to the identified multi-node computer system for accelerated execution that can efficiently execute the parallel programming structures.

Figure 5:
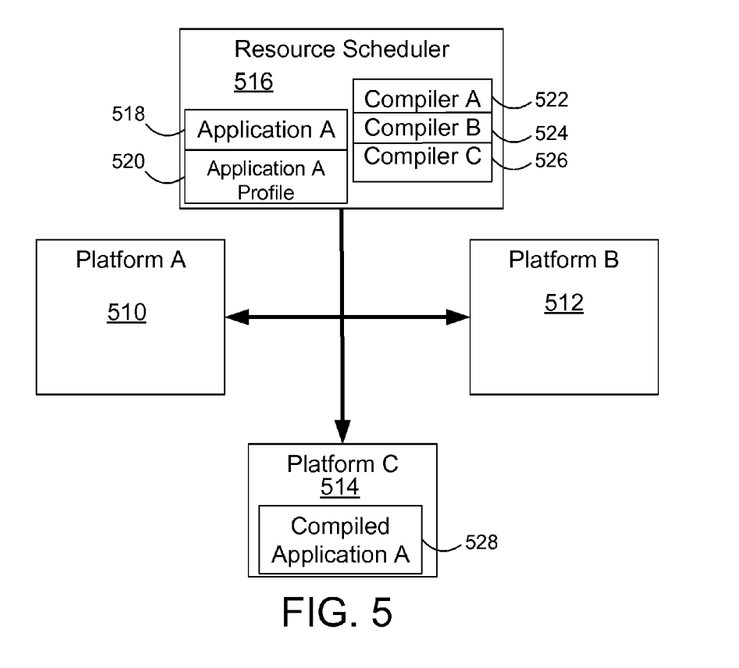
FIG. 5 shows a block diagram of a hybrid system with multiple platforms.

For the second case introduced above, the resource scheduler determines where to execute the application based on the application profile before execution of the application. In this case the resource scheduler can allocate applications that are stored in an uncompiled state to save system resources. This could be advantageous where there are several platforms in the hybrid system. FIG. 5 illustrates an example where the application is stored uncompiled before being allocated for execution by the resource scheduler. The system in FIG. 5 has three platforms, platform A 510, platform B 512 and platform C 514. A resource scheduler 516 may reside in one of these platforms or in a different system. The resource scheduler 516 analyzes application A 518 and an application profile 520 associated with application A. The resource scheduler has access to compilers for each of the platforms in the system. Thus compiler A 522 is for platform A, compiler B 524 is for platform B, and compiler C 526 is for platform C. After the resource scheduler determines which platform to execute Application A based on the information in the application profile as described above, the application is compiled using the corresponding compiler and then the compiled application 528 is sent to the appropriate platform for execution (platform C 514).

Figure 6:
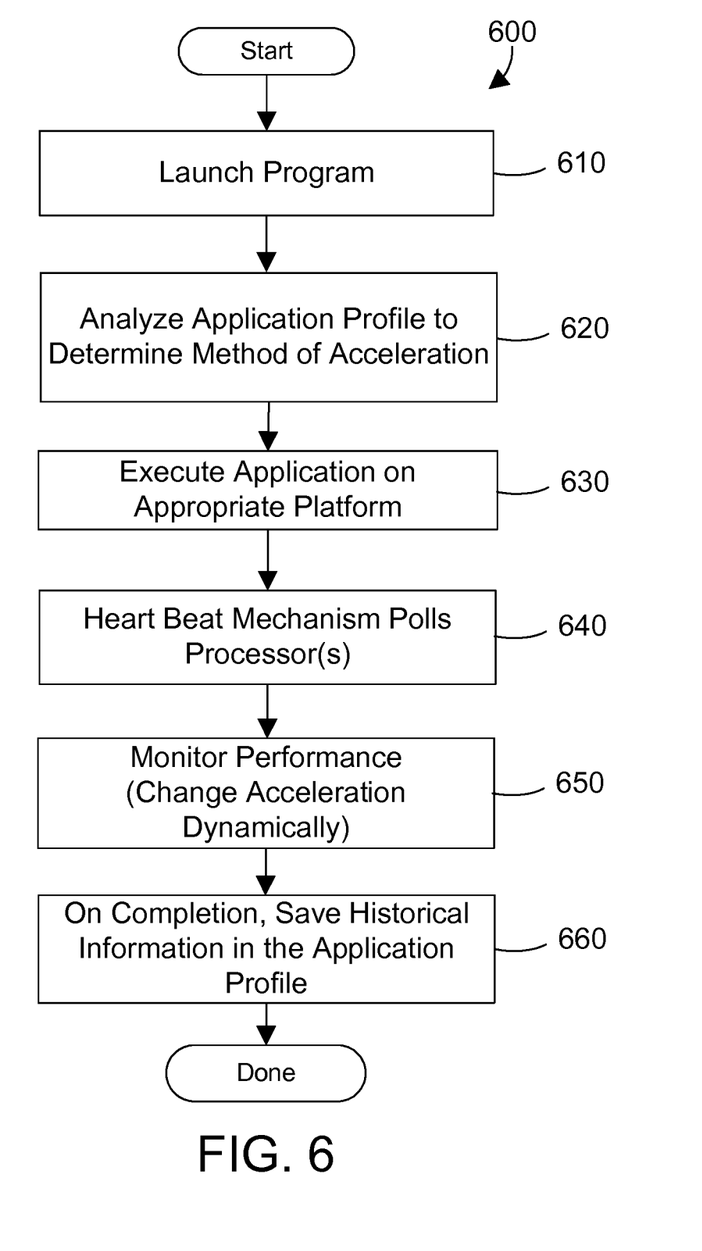
FIG. 6 is a method flow diagram for a method of optimizing power consumption and performance on hybrid computer system.

FIG. 6 shows a method 600 for optimizing efficiency and power consumption in a hybrid computer system. The steps in method 600 are preferably performed by a resource scheduler 143 in the service node 140 and heart beat mechanism 144 in the compute node 110. The first step is to launch a program (typically on a front-end computer system) on the hybrid computer system (step 610). Next, analyze the application profile to determine the method of acceleration to use (step 620) and execute the application on the appropriate platform determined in the previous step (step 630). Next, the heart beat mechanism polls the processors to monitor the execution (step 640). Then monitor the performance and change acceleration dynamically if needed (step 650). During the execution of the application, gather historical information about the power and efficiency of the execution and upon completion save the gathered historical information in the application profile (step 660). The method is then done.

Figure 7:
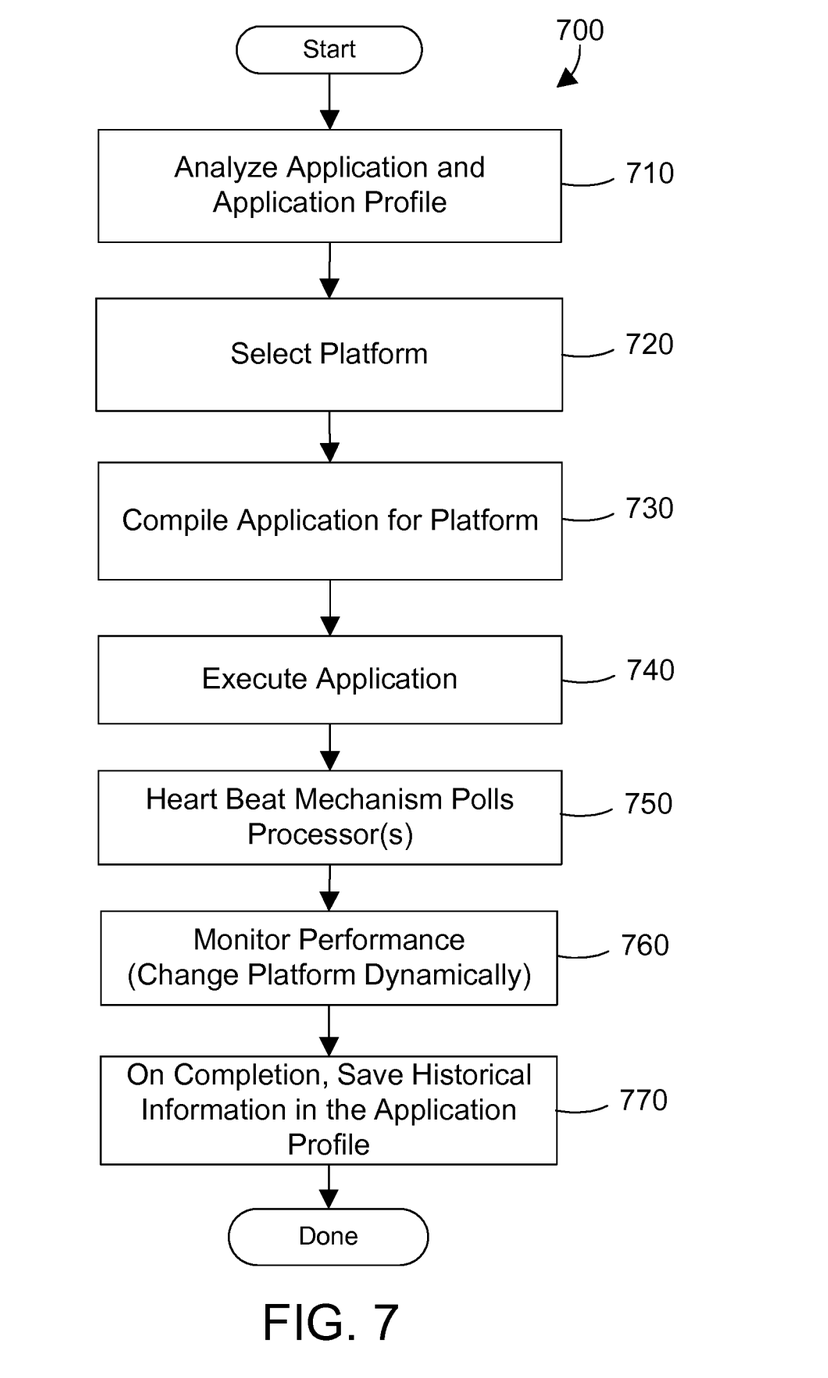
FIG. 7 is a method flow diagram that illustrates selecting a platform and compiling an application to optimize power consumption and performance on a hybrid computer system.

FIG. 7 shows a method 700 for optimizing efficiency and power consumption in a hybrid computer system. The steps in method 700 are preferably performed by a resource scheduler 143 in the service node 140 and heart beat mechanism 144 in the compute node 110. Method 700 is similar to method 600 but provides for compilation of the application for the platform to provide the acceleration of the application. The first step is to analyze the application and the application profile (step 710). Next, select the appropriate platform for execution (step 720). Next, compile the application for the selected platform (step 730) and execute the application on the selected platform (step 740). Next, the heart beat mechanism polls the processors to monitor the execution (step 750). Then monitor the performance and change acceleration dynamically if needed (step 760). Then, upon completion save the historical information in the application profile (step 770). The method is then done.

An apparatus and method is described herein to optimize the efficiency and power consumption in a hybrid computer system. One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A hybrid computer system comprising:
  a plurality of computer platforms connected together including a front-end computer system and a multi-node computer system;
  an application with an application profile, wherein the application includes a portion of the application which can be accelerated and where the application profile includes historical information for the application and user preferences, wherein the historical information records a historical power consumption and run time of the portion of the application executing on the multi-node computer system and a historical power consumption and run time of the portion of the application running on the front-end system;
  when the portion of the application that can be accelerated is encountered upon execution of the application on the front-end system, a resource scheduler analyzes the application profile to determine whether to accelerate the portion of the application based on the historical information and the user preferences in the application profile;
  wherein the resource scheduler determines an increased power consumption and a run time improvement by comparing the historical power consumption and run time on the portion of the application executing on the multi-node computer system and the historical power consumption and run time on the portion of the application running on the front-end system; and
  wherein when the resource scheduler determines that the increased power consumption is low compared to the run time improvement the resource scheduler sends the application to the multi-node computer system for accelerated execution.

2. The hybrid computer system of claim 1 wherein the resource scheduler determines where to execute the entire application based on the historical information and user preferences in the application profile.

3. The hybrid computer system of claim 2 wherein the resource scheduler further compiles the application program with a compiler appropriate for the selected one of the plurality of platforms prior to execution of the application on the selected platform.

4. The hybrid computer system of claim 1 wherein the resource scheduler further uses an appropriate compiler to compile the application program for the selected one of the plurality of platforms prior to execution of the portion of the application on the selected platform.

5. The hybrid computer system of claim 1 wherein the multi-node computer system is a massively parallel computer system comprising a plurality of compute nodes that each comprise a processor and memory connected by at least one network.

6. The hybrid computer system of claim 1 wherein the application profile includes items selected from the following: time of day priorities for an application, system temperature when the application was executing, power consumption/runtime priority, cost to run, hardware match characteristics, historical temperature, historical power consumption, and historical run time.

7. The hybrid computer system of claim 1 wherein the application profile includes hardware match characteristics that indicates the application has parallel programming structures and wherein the resource scheduler sends the application a multi-node computer system for accelerated execution that can efficiently execute the parallel programming structures.

8. A computer-readable article of manufacture comprising:
  an application profile associated with an application wherein the application includes a portion of the application which can be accelerated and where the application profile includes historical information for the application and user preferences, wherein the historical information records a historical power consumption and run time of a portion of the application executing on a multi-node computer system and a historical power consumption and run time of the portion of the application running on a front-end system, wherein the resource scheduler determines an increased power consumption and a run time improvement by comparing the historical power consumption and run time on the portion of the application executing on the multi-node computer system and the historical power consumption and run time on the portion of the application running on the front-end system;

when the portion of the application that can be accelerated is encountered upon execution of the application on the front-end system, a resource scheduler analyzes the application profile to determine whether to accelerate the portion of the application on based on the historical information and user preferences in the application profile;

wherein the resource scheduler determines that the increased power consumption is low compared to the run time improvement, the resource scheduler sends the application to the multi-node computer system for accelerated execution; and non-transitory computer recordable media bearing the application, the associated application profile and the resource scheduler.

9. The article of manufacture of claim 8 wherein the resource scheduler determines where to execute the entire application based on the historical information and user preferences in the application profile.

10. The article of manufacture of claim 9 wherein the resource scheduler further uses an appropriate compiler to compile the application program for the selected one of the plurality of platforms prior to execution of the application on the selected platform.

11. The article of manufacture of claim 8 wherein the resource scheduler further compiles the application program with a compiler appropriate for the selected one of the plurality of platforms prior to execution of the portion of the application on the selected platform.

12. The article of manufacture of claim 8 wherein the multi-node computer system is a massively parallel computer system comprising a plurality of compute nodes that each comprise a processor and memory connected by at least one network.

13. The article of manufacture of claim 8 wherein the application profile includes items selected from the following: time of day priorities for an application, system temperature when the application was executing, power consumption/runtime priority, cost to run, hardware match characteristics, historical temperature, historical power consumption, and historical run time.

* * * * *